UNITED STATES PATENT OFFICE.

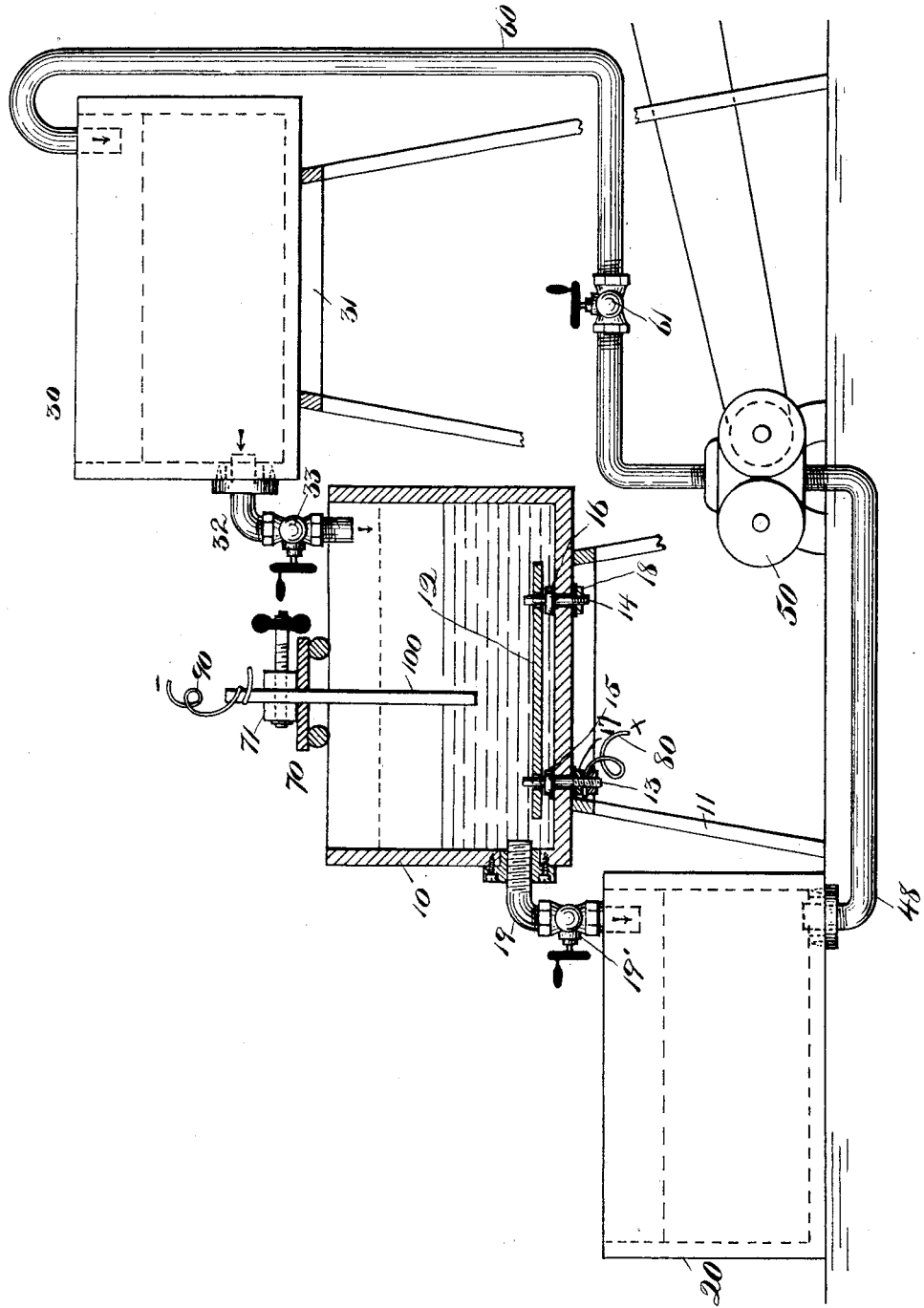

GEORGE D. BURTON, OF BOSTON, MASSACHUSETTS.

APPARATUS FOR ELECTRICALLY HEATING METAL.

SPECIFICATION forming part of Letters Patent No. 537,404, dated April 9, 1895.

Application filed November 6, 1894. Serial No. 528,076. (No model.)

*To all whom it may concern:*

Be it known that I, GEORGE DEXTER BURTON, a citizen of the United States of America, residing at Boston, in the county of Suffolk, in the State of Massachusetts, have invented certain new and useful Improvements in Apparatus for Electrically Heating Metal, of which the following is a specification.

This invention relates to the art of working metal for forging or other metal working operations by immersing the metal or that portion thereof to be heated in a bath and passing therethrough an electric current of such a character as to cause the formation of an incandescent gas envelope or electric arc at or below the surface of the solution and around the metal to be heated, whereby the heating thereof is quickly effected.

The object of the invention is to provide a convenient apparatus for this purpose which will permit the convenient handling of large pieces or bars of metal.

The drawing represents a side elevation partly in section of this apparatus.

The electric bath heating tank 10 may be supported in any suitable manner as on a bench 11. The tank is provided with an electrode 12 of comparatively large area disposed in the bottom of the tank and preferably constructed of lead, being adapted to serve as an anode. Studs 13 and 14 project through the bottom of the tank and through holes in the electrode 12, said studs being provided with flanges or collars 15 and 16, which rest on the bottom of the tank. The lower ends of these studs outside of the bottom of the tank are screw-threaded and provided with clamping nuts 17 and 18. The stud 13 is elongated and serves as a binding post. This tank 10 is provided with an outlet pipe 19, having a stop valve 19' provided with an insulated hand wheel.

The receiving tank 20 is disposed on a plane below the electric heating tank 10 adjacent to said tank 10 and in position to receive the liquid discharged from said tank 10 through the pipe 19.

A reservoir or supply tank 30 is supported on a bench 31, or other suitable support, on a plane above the electric heating tank 10, and this tank 30 is provided with an outlet pipe 32 near its bottom which pischarges into the top of said electric tank, said pipe being provided with a valve 33 having an insulated hand wheel.

An outlet pipe 40 leads from the bottom of the receiving tank 20 to a pump 50 and a pipe 60 leads from said pump to the reservoir tank 30, preferably discharging thereinto near the top thereof. The pump 50 is of any suitable form, a rotary pump being illustrated. The pipe 60 is provided with a valve 61.

A traveling carriage 70 supported on rollers on the top of the electric tank 10 carries a clamp 71 for clamping the electrodes to be heated.

A conductor 80, connected at one end with the binding post 13, and at the other end with the positive pole of an electric source, serves to convey the current from the dynamo, main street wire, or other source, to the anode in the tank 10, and a conductor 90 is adapted for connection with the electrode 100 to be heated, being connected with the negative pole of the electric source.

The liquid constituting the bath may consist of a solution composed of water, carbonate of soda and powdered borax, in the proportions of eight parts of water, to twelve pounds of soda and one pound of powdered borax. I do not confine myself to this particular solution as other solutions may be used, and the proportions of this solution may be changed, without departing from the scope of this invention.

The current used may have a voltage varying from one hundred and twenty volts upward and an ampèrage of from forty ampères upward according to the size of the piece to be heated. With a current of the voltage and ampèrage specifically named, I have heated bars of steel and of iron from one fourth of an inch to three fourths of an inch in cross section for a length of three inches to a red heat, white heat, or to the fusing point, in about a minute to a minute and a quarter.

In the use of this apparatus, a bath composed of the required constituents is placed in each of the tanks 10, 20 and 30. The electrode as 100 to be heated is immersed or partially immersed in the bath contained in the tank 10 and the required electric current is passed through said bath and electrode forming an electric arc or incandescent gas envelope between the submerged portion of the electrode and the liquid of the bath, whereby said electrode is heated to incandescence to a red or white heat, or to the fusing point, in a few seconds or minutes. To keep the liquid in a fresh and active condition, the pump 50 is operated during the heating operation, keeping the liquid in circulation. Fresh water or solution may be added from time to time in the receiving tank 20 to take the place of that which evaporates.

I claim as my invention—

In an electric bath metal heating apparatus, the combination of a vessel for containing an electrolytic bath and having an electrode of comparatively large area, a traveling carriage supported on said vessel and adapted to hold the metal to be heated, a receiving vessel disposed on a plane below the vessel containing the electrolytic bath, a reservoir vessel disposed above said electrolytic vessel, pipes connecting said vessels, a pump for elevating the liquid from the receiving vessel to the reservoir vessel, means for regulating the flow of said liquid, and conductors connecting the electrolytic bath and the metal to be heated with opposite electric poles.

GEO. D. BURTON.

Witnesses:
GEO. S. EVANS,
A. C. GARSIA.